(12) United States Patent
Riedl et al.

(10) Patent No.: US 7,808,147 B2
(45) Date of Patent: Oct. 5, 2010

(54) ROTOR FOR PERMANENT MAGNET MOTOR

(75) Inventors: Reinhard Riedl, Finning (DE); Thomas Pritzen, Inningen (DE)

(73) Assignee: Hilti Aktiengesellschaft, Schaan (LI)

( * ) Notice: Subject to any disclaimer, the term of this patent is extended or adjusted under 35 U.S.C. 154(b) by 289 days.

(21) Appl. No.: 12/082,201

(22) Filed: Apr. 8, 2008

(65) Prior Publication Data

US 2008/0252165 A1   Oct. 16, 2008

(30) Foreign Application Priority Data

Apr. 10, 2007   (DE) .................... 10 2007 000 213

(51) Int. Cl.
*H02K 1/17*   (2006.01)
(52) U.S. Cl. .................... 310/216.016; 310/156.53; 310/156.56; 310/216.048
(58) Field of Classification Search ................
310/156.53–156.56, 216.016, 216.018, 216.048, 310/216.091–216.094
See application file for complete search history.

(56) References Cited

U.S. PATENT DOCUMENTS

| | | | | |
|---|---|---|---|---|
| 5,463,262 | A | * | 10/1995 | Uchida .................. 310/156.61 |
| 5,886,441 | A | * | 3/1999 | Uchida et al. .......... 310/156.57 |
| 6,437,474 | B1 | * | 8/2002 | Chu ....................... 310/156.53 |
| 2006/0163967 | A1 | * | 7/2006 | Yamamoto et al. ......... 310/216 |

FOREIGN PATENT DOCUMENTS

| | | | |
|---|---|---|---|
| DE | 10100717 C1 | | 7/2002 |
| JP | 01146773 A | | 6/1989 |
| JP | 04255439 A | * | 9/1992 |
| JP | 2000156946 A | * | 6/2000 |

* cited by examiner

*Primary Examiner*—Tran N Nguyen
(74) *Attorney, Agent, or Firm*—Abelman, Frayne & Schwab

(57) ABSTRACT

A rotor (3) for a permanent magnet motor has a is rotatable around an axis of rotation (A) and has a plurality of axially extending permanent magnets (6) which are offset circumferentially in a symmetrical manner and arranged, respectively, in receptacles (16) of a yoke (7) which is assembled from axially stacked sheet lamellas (10), with the sheet lamellas (10) each having a coaxial inner hole (9), at least a first recess (8a) which is open toward the inner hole (9), and one second recess (8b) which is closed toward the inner hole (9), and with the lamellas being formed in a rotationally symmetrical manner so as to be offset at least by a phase angle, with at least two sheet lamellas (10) being oriented so as to be offset relative to one another by half of the phase angle.

10 Claims, 4 Drawing Sheets

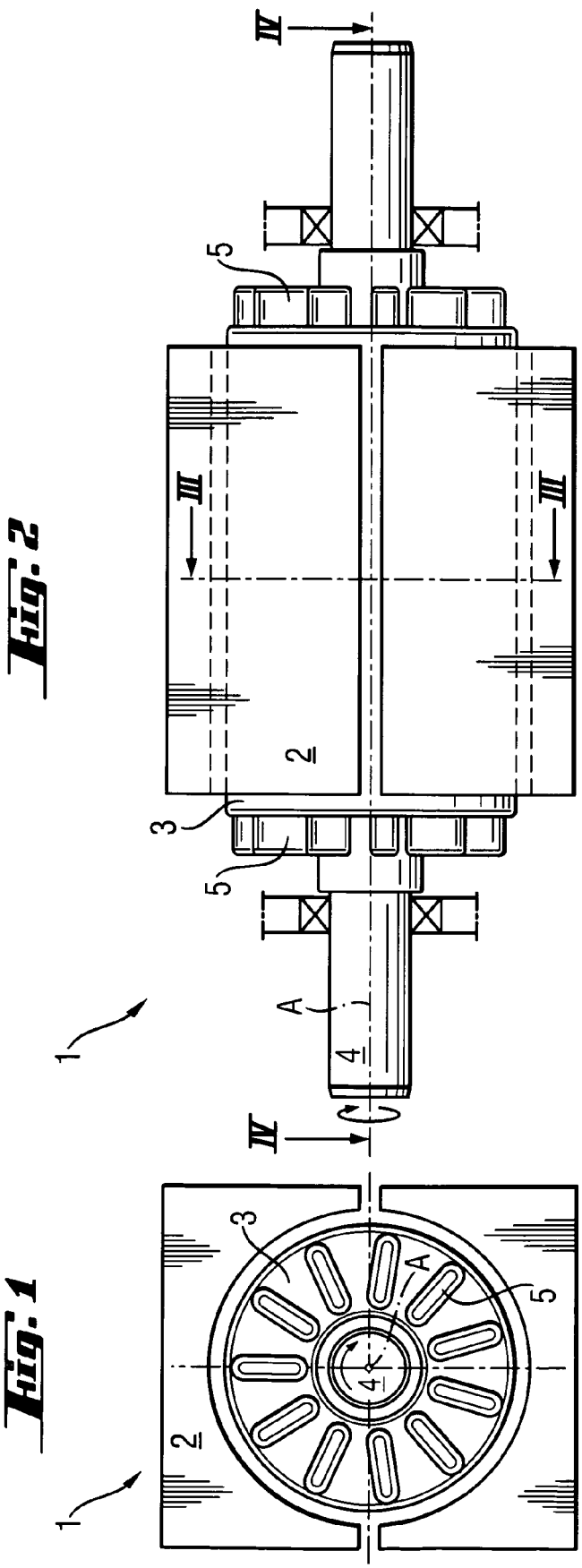

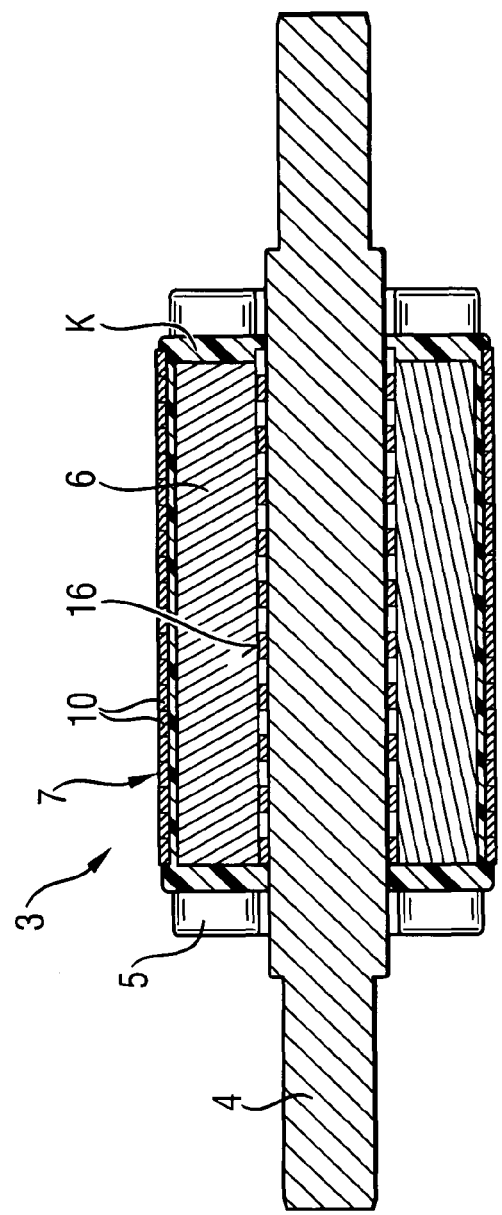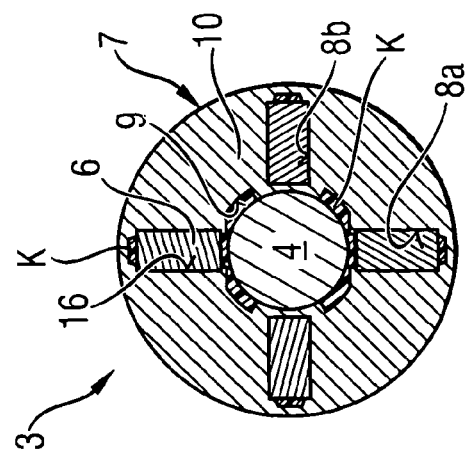

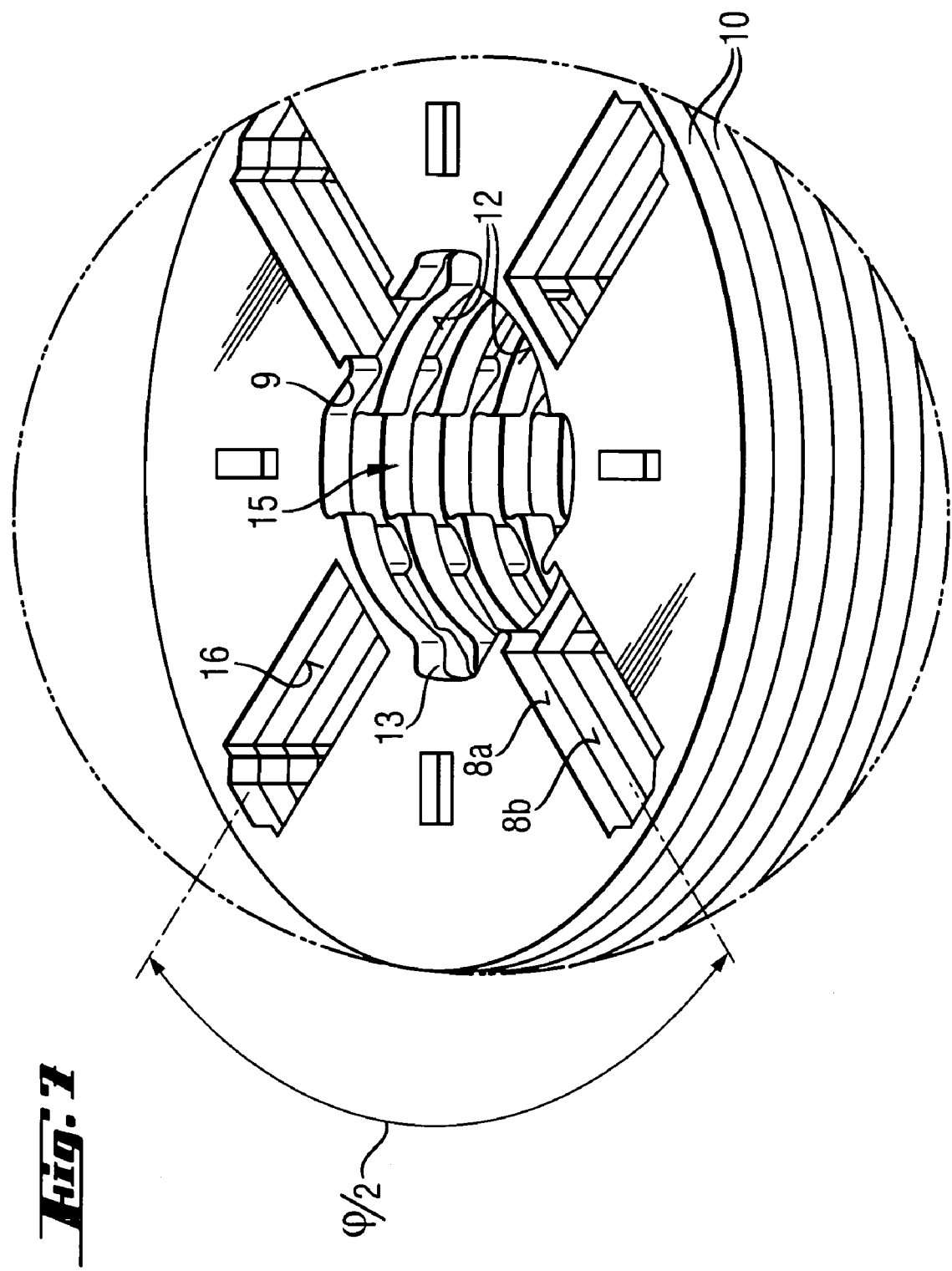

ROTOR FOR PERMANENT MAGNET MOTOR

BACKGROUND OF THE INVENTION

1. Field of the Invention

The present invention relates to a permanent magnet motor with a rotor, particularly suitable for the drive of a hand-held electric power tool and, more specifically, to a rotor of the permanent magnet motor.

2. Description of the Prior Art

The rotors of permanent magnet motors of this type have a plurality of circumferentially distributed permanent magnets which are driven in the rotating magnetic field of a stator when used appropriately in brushless permanent magnet motors. The permanent magnets are fixed in a known manner on their base body, which is preferably formed as a stack of lamellas, which sometimes is referred to as "yoke," by gluing, plastic injection molding or by mechanical means.

According to German Publication DE 103 49 442, the permanent magnets having a certain tolerance and which are provided beforehand with baked lacquer coatings are glued to the yoke by re-melting in order to avoid plastic injection molding, which is difficult to control.

Fan blades, which are formed at an end side of an injection-molded rotor, are known from German Publication DE 44 30 073.

According to U.S. Pat. No. 6,047,460, a rotor of this type has four axially extending permanent magnets which are circumferentially distributed in a symmetrical manner and which are inserted into receptacles of an assembled yoke having axially stacked and (with the exception of the axial end caps) identically oriented sheet lamellas with a coaxial inner hole and, respectively, four closed recesses. As only two diametrically opposite recesses are mirror symmetrical with respect to one another, the sheet lamellas are rotationally symmetrical by pairs (rotated by 180°) but not by fours (rotated by 90°). Since the receptacle shape, as such, is the same in circumferentially adjacent receptacles but is not oriented in a radially mirror-reflected manner, associated homogeneously formed permanent magnets can only be used with circumferentially alternating magnet orientations, which is necessary for the rotating operation of the permanent magnet motor. Since the permanent magnets are shrinkage-fitted in a positive engagement into the yoke, which is heated beforehand, mass tolerances of the permanent magnets are not permissible in practice.

SUMMARY OF THE INVENTION

It is the object of the invention to provide a permanent magnet motor with a rotor with permanent magnets that are subject to tolerances suitable for plastic injection molding.

This and other objects of the present invention, which will become apparent hereinafter, are achieved by providing a rotor which is rotatable around an axis of rotation and which has a plurality of axially extending permanent magnets which are circumferentially distributed in a symmetrical manner and which are arranged, respectively, in receptacles of a yoke with axially stacked sheet lamellas having, in each instance, a coaxial inner hole and being formed so as to be rotated in a rotationally symmetric manner at least by a phase angle, with at least two sheet lamellas being oriented relative to one another so as to be offset by half of the phase angle, and with the sheet lamellas each having at least a first recess which is open toward the inner hole and a second recess which is closed toward the inner hole, with the first and second recesses of the lamellas forming the magnet-receiving receptacles of the yoke.

The overlapping of the open recess and the closed recess brought about by the rotation of the sheet lamellas results in receptacles suitable for the permanent magnets and which, in an axially offset manner, have a complete circumferential guide and an edge opening which opens toward the inner hole. The edge opening allows the plastic, with which a rotor shaft extending coaxially through the inner hole is injection molded, to also penetrate into the receptacles so as to achieve a reliable fixing of the permanent magnets which are provided with certain tolerances.

The sheet lamella advantageously forms a guide portion at the inner hole, which guide portion has a guide contour which runs along a coaxial guide circle or contacts this coaxial guide circle only on the radial outer side and through which a rotor shaft, which extends coaxially through the inner hole, is form-lockingly guided into the yoke.

The guide contour, or at least some of its portions, advantageously extends circularly so that a smooth positive guide is formed in the yoke for the rotor shaft to be introduced. This positive guide prevents any deformations in the yoke as well as scratches on the rotor shaft when the rotor shaft is inserted into the yoke prior to injection molding.

Notches which open toward the inner hole and are circumferentially offset are advantageously provided in the sheet lamella between the recesses and extend along a notch angle which is quantitatively greater than half of the phase angle, so that an axially extending injection channel is formed as a result of the overlapping of the notches in the yoke when a rotor shaft extending coaxially through the inner hole is injection molded with plastic. This injection channel facilitates uniform penetration of the plastic into all of the recesses.

Two axially adjacent sheet lamellas are advantageously offset in the yoke in each instance by half of the phase angle so that the recess which opens toward the inner hole is distributed axially in a uniform manner.

The sheet lamellas are advantageously rotationally symmetric by a whole number, but not in a twofold manner, so that every two recesses are open and closed in an alternatingly offset manner circumferentially. In this regard, it is unimportant whether two axially adjacent sheet lamellas are offset by half of the phase angle of 90° in the same direction or in alternating direction.

The sheet lamellas are advantageously rotationally symmetric by pairs, but not by fours, so that every two recesses are open and closed in an alternating offset manner circumferentially. In this regard, it is unimportant whether two axially adjacent sheet lamellas are stacked in a rotationally offset manner by half of the phase angle of 90° in the same direction or in alternating direction.

Two axially adjacent sheet lamellas are advantageously circumferentially offset by half of the phase angle in the same direction in the yoke in each instance, so that the recesses which open toward the inner hole each form an open helical channel circumferentially in which plastic can advantageously be injected.

The sheet lamella advantageously has exactly two open and two closed recesses in each instance, so that exactly four helical channels are open in each instance to every axially second recess.

The sheet lamella advantageously has stamped bundling points which are arranged so as to be distributed over the full circumference by half of the phase angle and which project out axially with respect to one lamella side and are pressed in axially with respect to the other lamella side so as to be suitably stackable so that the sheet lamellas which are stacked by exactly half of the phase angle to form the yoke can be placed in a positive engagement.

In the associated production process, a yoke, with radially rotationally offset, axially extending receptacles for permanent magnets and with a coaxial inner hole for a rotor shaft, is produced in a first step from sheet lamellas which are stacked so as to be rotationally offset relative to one another. In a second step, the permanent magnets are inserted into the receptacles and the rotor shaft is inserted into the inner hole, and this assembled rotor is introduced into an injection molding die in a third step. In a fourth step, the rotor shaft is injection molded with plastic material. The plastic penetrates into the receptacles via the recesses of the sheet lamellas, which are open toward the inner hole, and permanent magnets are fixed in the receptacles by a material bond.

In the fourth step, the plastic advantageously penetrates into the open recesses of the sheet lamellas via notches which open toward the inner hole so that the material-bonding fixing of the permanent magnets is uniform axially.

In the fourth step, axially projecting, circumferentially distributed fan blades are advantageously formed out of plastic at the front side of the rotor by means of blade notches in the injection molding die, so that there is no longer any need to produce and assemble a rotor fan separately.

This rotor is used together with an associated stator for producing a brushless permanent magnet motor, particularly for a hand-held electric power tool.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show:

FIG. 1 a top view of a brushless permanent magnet motor with a rotor according to the present invention;

FIG. 2 a side view of a brushless permanent magnet motor shown in FIG. 1;

FIG. 3 a cross-sectional view of the rotor along line III-III in FIG. 2;

FIG. 4 a longitudinal cross-sectional view of the rotor along line IV-IV in FIG. 2;

FIG. 7 a perspective view of a detail of the yoke.

DETAILED DESCRIPTION OF THE PREFERRED EMBODIMENT

Figure 5:
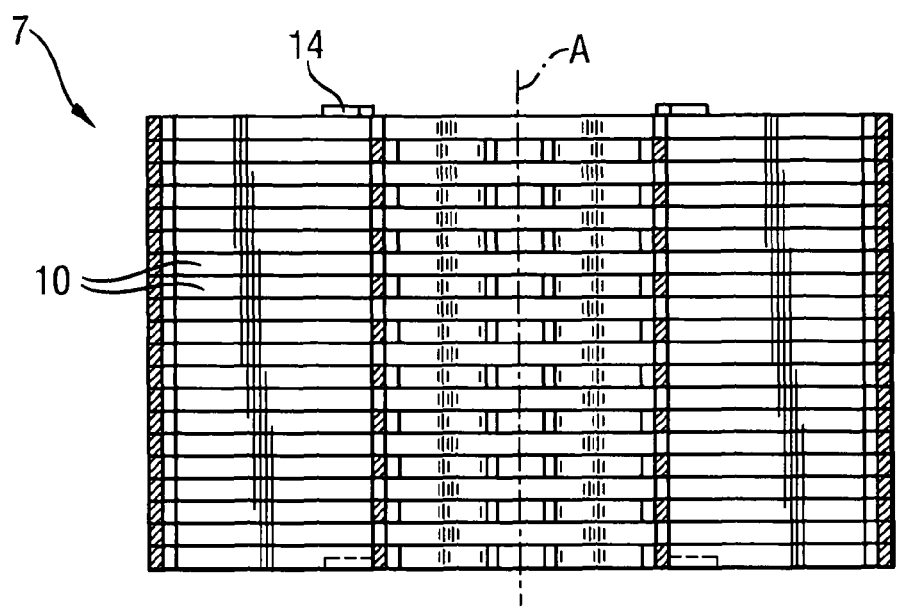
FIG. 5 a longitudinal cross-sectional view of the yoke.

According to FIG. 1 and FIG. 2, a brushless permanent magnet motor 1 of a hand-held electric tool (not shown) includes a stator 2 and a rotor 3, which is supported so as to be rotatable around an axis of rotation A and which has a rotor shaft 4. Axially projecting, circumferentially distributed fan blades 5 are formed at both end sides of the rotor 3.

According to FIG. 3 and FIG. 4, the fan blades 5 are formed of a plastic material K, which surrounds the rotor shaft 4 and, at least partly, the four axially extending permanent magnets 6 which have certain tolerances, so that the latter are permanently fixed in the four axially extending receptacles 16 of a yoke 7 of the rotor which includes axially stacked sheet lamellas 10. The sheet lamellas 10 have, respectively, two open recesses 8a and two closed recesses 8b with respect to a coaxial inner hole 9 that radially surrounds the rotor shaft. The recesses 8a and 8b are circumferentially symmetrically distributed.

According to FIG. 5, the yoke 7 is formed of sheet lamellas 10 which are arranged so as to be oriented rotationally offset to one another in an axially alternating manner by means of stamping bundling points 14 which formlockingly fit inside one another and which project out axially with respect to one lamella side and are axially pressed in with respect to the other lamella side.

Figure 6:
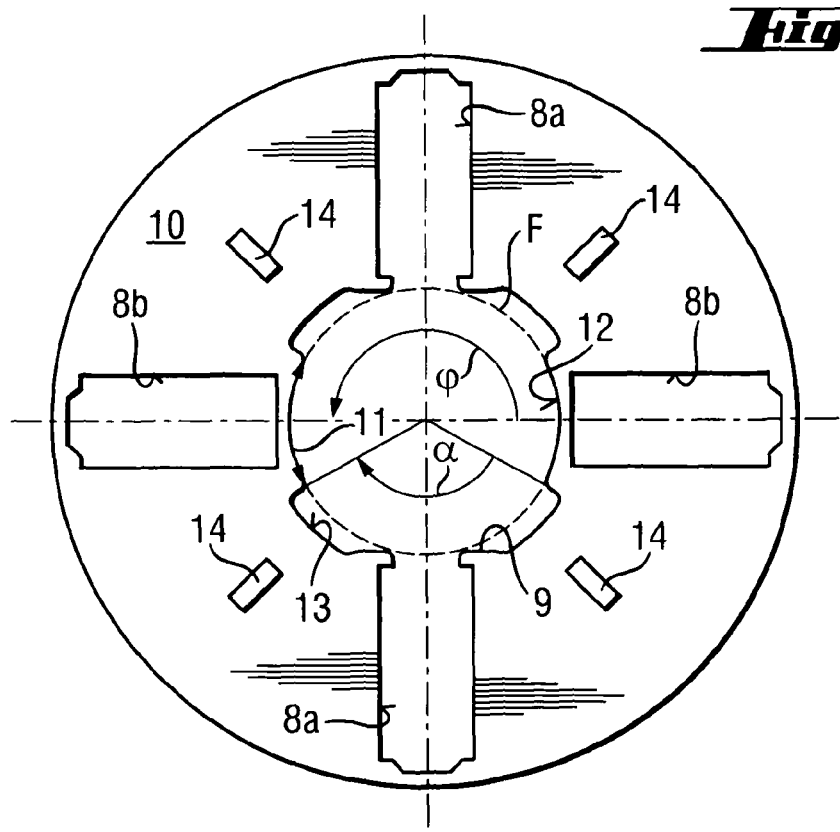
FIG. 6 a top view of a sheet lamella.

According to FIG. 6, the sheet lamellas 10 are arranged rotationally symmetrical so as to be rotated by a phase angle φ of 180°, but not by 90°. Accordingly, the sheet lamellas 10 are rotationally symmetrical in pairs, but not by fours. The sheet lamellas 10 have a guide contour 12 at the coaxial inner hole 9. The guide contour 12 forms a guide portion 11, with the guide contour 12 extending circularly over a coaxial guide circle F. The sheet lamella 10 has exactly two open recesses 8a and two closed recesses 8b, between which there are provided in each instance circumferentially offset notches 13 which open toward the inner hole 9 and which extend in each instance over a notch angle α that, at 120°, is greater than half of the phase angle φ of 90°. Further, the sheet lamella 10 has four stamping bundling points 14 which are arranged so as to be rotationally offset by exactly half of the phase angle φ.

According to FIG. 7, two axially adjacent sheet lamellas 10 are oriented relative to one another so as to be rotationally offset by half of the phase angle φ of 90°. Two diametrically opposed recesses 8a, 8b which are open toward the inner hole 9 and closed with respect to the inner hole 9, respectively, are stacked so as to overlap in an axially alternating manner and form the receptacles 16 for the permanent magnets 6 (FIG. 3). Further, the four guide contours 12 for the rotor shaft 4 (FIG. 3) are distributed circumferentially. The notches 13 form an axially extending injection channel 15 between the guide contours 12, the open recesses 8a being opened toward this injection channel 15.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A rotor (3) for a permanent magnet motor, comprising a yoke (7) formed of a plurality of axially stacked sheet lamellas (10) and having a plurality of receptacles (16); and a plurality of permanent magnets (6) symmetrically circumferentially offset relative to each other and are arranged in respective receptacles (16), wherein the lamellas (10) each has a coaxial inner hole (9), at least one first recess (8a) open toward the inner hole (9), and at least one second recess (8b) closed toward the inner hole (9), first and second recesses (8a, 8b) of the lamellas (10) forming the plurality of receptacles (16), wherein the lamellas (10) are formed rotationally symmetrically for rotation about at least a phase angle (φ), and at least two lamellas are offset relative to each other by a half of the phase angle (φ), and wherein notches (13) are provided in the sheet lamellas (10) between the recesses (8a, 8b) which open toward the inner hole (9) and are circumferentially offset and extend along a notch angle (α) which is quantitatively greater than half of the phase angle (φ).

2. A rotor according to claim 1, wherein the sheet lamella (10) forms a guide portion (11) at the inner hole (9), which guide portion (11) has a guide contour (12) which extends along a coaxial guide circle (F) or contacts the latter only on a radial outer side.

3. A rotor according to claim 2, wherein at least a portion of the guide contour (12), extends circularly.

4. A rotor according to claim 1, wherein each pair of respective axially adjacent sheet lamellas (10) are offset in the yoke (7) by half of the phase angle (φ).

5. A rotor according to claim 1, wherein the sheet lamellas (10) are rotationally symmetrical by a whole number, but not in a twofold manner.

6. A rotor according to claim 1, wherein the sheet lamellas (10) are rotationally symmetrical by pairs, but not by fours.

7. A rotor according to claim 1, wherein each pair of respective axially adjacent sheet lamellas (10) are circumferentially offset by half of the phase angle (φ) in the same direction in the yoke (7).

8. A rotor according to claim 1, wherein the sheet lamella (10) has exactly two open and two closed recesses (8a, 8b).

9. A rotor according to claim 1, wherein the sheet lamella (10) has stamping bundling points (14) which are arranged so as to be rotationally offset over the full circumference by half of the phase angle (φ) and which project out axially with respect to one lamella side and are pressed in axially with respect to another lamella side so as to be suitably stackable.

10. A permanent magnet motor, comprising a stator (2); and a rotor (3) which is surrounded by the stator (2) and includes a yoke (7) formed of a plurality of axially stacked sheet lamellas (10) and having a plurality of receptacles (16), and a plurality of permanent magnets (6) symmetrically circumferentially offset relative to each other and are arranged in respective receptacles (16), wherein the lamellas (10) each has a coaxial inner hole (9), at least one first recess (8a) open toward the inner hole (9), and at least one second recess (8b) closed toward the inner hole (9), first and second recesses (8a, 8b) of the lamellas (10) forming the plurality of receptacles (16), wherein the lamellas (10) are formed rotationally symmetrically for rotation about at least a phase angle (φ), and at least two lamellas are offset relative to each other by a half of the phase angle (φ), and wherein notches (13) are provided in the sheet lamellas (10) between the recesses (8a, 8b) which open toward the inner hole (9) and are circumferentially offset and extend along a notch angle (α) which is quantitatively greater than half of the phase angle (φ).

\* \* \* \* \*